United States Patent
Radbrandt

(10) Patent No.: US 8,203,856 B2
(45) Date of Patent: Jun. 19, 2012

(54) METHOD AND ARRANGEMENT TO REVERSE THE POWER FLOW OF A DIRECT CURRENT POWER TRANSMISSION SYSTEM

(75) Inventor: Ulf Radbrandt, Sunnansjö (SE)

(73) Assignee: ABB Technology AG, Zürich (CH)

( * ) Notice: Subject to any disclaimer, the term of this patent is extended or adjusted under 35 U.S.C. 154(b) by 358 days.

(21) Appl. No.: 12/531,399

(22) PCT Filed: Mar. 15, 2007

(86) PCT No.: PCT/EP2007/052431
§ 371 (c)(1),
(2), (4) Date: Dec. 28, 2009

(87) PCT Pub. No.: WO2008/110211
PCT Pub. Date: Sep. 18, 2008

(65) Prior Publication Data
US 2010/0091528 A1    Apr. 15, 2010

(51) Int. Cl.
*H02J 3/36* (2006.01)
*H02M 5/458* (2006.01)

(52) U.S. Cl. .......................................... 363/35; 363/37

(58) Field of Classification Search .................... 363/34, 363/35, 37, 95, 96
See application file for complete search history.

(56) References Cited

U.S. PATENT DOCUMENTS

| | | | | |
|---|---|---|---|---|
| 4,517,634 A | * | 5/1985 | Sakai | 363/35 |
| 5,396,411 A | * | 3/1995 | Konishi et al. | 363/37 |
| 5,701,239 A | * | 12/1997 | Bjorklund et al. | 363/35 |
| 6,963,187 B2 | * | 11/2005 | Bebic et al. | 323/207 |

FOREIGN PATENT DOCUMENTS
WO WO 2006/035018 4/2006

OTHER PUBLICATIONS

Uhlmann, E., "Power Transmission by Direct Current," 1975.
International search report, Dec. 12, 2007.
Written opinion of the international searching authority, Dec. 12, 2007.

* cited by examiner

*Primary Examiner* — Adolf Berhane
*Assistant Examiner* — Emily Pham
(74) *Attorney, Agent, or Firm* — Venable LLP; Eric J. Franklin

(57) ABSTRACT

A direct current power transmission system includes a first and a second converter station that are coupled to each other via a direct current link. Each converter station includes a first or second line commutated converter, respectively. Before power reversal the first converter is operated as a rectifier and the direct current is controlled in the first station, while the second converter is operated as an inverter and in the second station the extinction angle of the second converter or the direct voltage is controlled. After power reversal, the first converter is operated as an inverter and the second converter as a rectifier. During power reversal a change is carried out in the first station from control of the direct current to control of the extinction angle of the first converter or to control of the direct voltage, which is performed in synchronization with a change in the second station from control of the extinction angle of the second converter or from control of the direct voltage to control of the direct current.

13 Claims, 4 Drawing Sheets

# METHOD AND ARRANGEMENT TO REVERSE THE POWER FLOW OF A DIRECT CURRENT POWER TRANSMISSION SYSTEM

CROSS-REFERENCE TO RELATED APPLICATIONS

This application is the national phase under 35 U.S.C. §371 of PCT/EP2007/052431 filed 15 Mar. 2008.

FIELD OF THE INVENTION

The invention relates to a method and an arrangement to reverse the power flow between a first and a second converter station which are coupled to each other via a direct current link, where each converter station comprises a first or second line commutated converter, respectively. Before power reversal, the first station is operated as rectifier and the direct current in the link is controlled in the first station, while the second station is operated as inverter and its extinction angle is controlled in the second station. After power reversal, the first station is operated as inverter and the second station as rectifier. The arrangement comprises a first control unit in the first station and a second control unit in the second station to perform the power reversal method.

BACKGROUND OF THE INVENTION

Direct current power transmission systems are used today to interconnect AC power systems and to transmit the power at high voltages over long distances. These systems are known in the art as High Voltage Direct Current (HVDC) transmission systems. Such a HVDC system can for example be used to link two independent AC power grids so that power can be transferred from one grid to the other for power trade purposes. Depending on the price and supply situation of the two grids, frequent power reversals may be necessary to change the direction of power flow from one grid to the other.

The main parts of a HVDC system are the DC link in form of one or a multiple of power cables or overhead lines and a converter station at each end of the DC link containing a power converter. The power converter which transforms AC into DC is called rectifier, and the power converter transforming DC into AC is called inverter.

SUMMARY OF THE INVENTION

The rectifier transfers active power from the AC side to the DC side and the inverter transfers active power from the DC side to the AC side. Hence, the power in the DC link flows from the rectifier to the inverter.

The HVDC converters which are subject of the present invention contain thyristor valves arranged in a power bridge. The functional principle of such a converter type is widely known in the art, see for example E. Uhlmann, "Power Transmission by Direct Current", ISBN 3-540-07122-9. For explanatory purposes it is recalled here only that a thyristor valve is fired during the positive forward voltage half period, i.e. during the positive 180 electrical degrees. The angle between the voltage zero crossing from negative to positive and the firing of the valve is called delay angle $\alpha$. The commutation between two thyristor valves, i.e. the take over of the current flow from a first valve to a second valve connected in parallel from different AC phases, is delayed due to the inductance in the converter transformers, i.e. the two thyristor valves are conducting current at the same time, until the current in the first valve falls below a threshold and the valve extinguishes. The angle from when the thyristor valve is extinguished to the end of the positive forward voltage half period is called extinction angle $\gamma$.

For rectifier operation, the delay angle $\alpha$ is low, typically about 15 degrees, and for inverter operation, the delay angle $\alpha$ is comparatively high, typically about 140 degrees at nominal direct current.

Each converter, no matter if in rectifier or inverter operation mode, generates harmonic currents and consumes reactive power, basically due to switching of the thyristor valves. According to this, it is common to install special elements for reactive power compensation and for filtering of the harmonics at the converter stations, such as AC filter banks and shunt capacitor banks.

The amount of reactive power consumption depends on the respective firing or extinction angle in the converter, where for rectifier operation a higher delay angle $\alpha$ and for inverter operation a higher extinction angle $\gamma$ results in higher reactive power consumption. In order to limit the reactive power consumption, it is therefore desirable to have a low delay angle $\alpha$ for rectifier operation and a low extinction angle $\gamma$ for inverter operation.

Accordingly, it is commonly known to control the extinction angle $\gamma$ in the inverter to be at a minimum $\gamma$-reference value, while the direct current in the link is controlled via adjusting the delay angle $\alpha$ in the rectifier.

A power reversal is achieved by changing the operation modes in the converters from rectifier to inverter and vice versa and by reversing the direct voltage. Typically, a power reversal is achieved by reducing the direct current in order to decrease the active power, followed by a temporary block of the converters at minimum power and a restart of the converters with newly adjusted delay angles $\alpha$. The operation at low direct current is disadvantageous since it results in reduced reactive power consumption in the converters which may lead to increased reactive power generation to the AC system.

In order to avoid the negative effect of low direct current operation during power reversal, the WO 2006/035018 A2 suggests a method for power flow control where the direct current and direct voltage are controlled by the two converters simultaneously so that the net reactive power absorbed at each converter remains approximately constant. Accordingly, the variation in the magnitude of direct current is kept relatively small, so that even during power reversal a significant reactive power consumption is maintained. This reduces the number of switching operations of the elements for reactive power consumption, thereby increasing their lifetime. The WO 2006/035018 A2 demands that the first of the two converter stations is made the direct voltage control point while the second converter station is made the direct current control point, irrespective of the power direction.

It is an object of the current invention to provide an alternative method and arrangement of the kind referred to in the introduction with which during power reversal the reactive power consumption can be maintained at a considerable level.

This object is achieved by a method and by an arrangement.

The invention is based on the recognition of the fact that the condition of the method of WO 2006/035018 A2 to perform the direct voltage control always in one of the converter stations and the direct current control always in the other, irrespective of the power direction, implies a significant disadvantage. This is caused by the fact that in one of the power flow directions, it is the inverter with which the direct current control is performed, by adjusting its delay angle $\alpha$. As a result, the extinction angle $\gamma$ in the inverter can no longer be controlled at a minimum value, because the delay angle $\alpha$ and the extinction angle $\gamma$ are interdependent. Instead, a comparatively high control margin needs to be added to the minimum γ-reference value to ensure proper functioning of the converter. This control margin for the inverter leads to a considerably higher control angle for the inverter (γ) than the control angle for the rectifier (α) used if the rectifier performs the direct voltage control. The requirement of a higher control angle leads to the necessity of higher rated converters for the current controlling converter of the HVDC system which increases the system costs significantly.

In order to overcome this problem, the invention suggests to move the direct current control during power reversal from one converter station to the other and to synchronize this move with the move of the extinction angle control in the opposite direction. The change of control modes in the two converter stations during power reversal reduces the costs, since before and after power reversal it is always the rectifier which controls the direct current.

The synchronization of the change of control parameters ensures that during power reversal the control modes can be exchanged without temporarily blocking the converters to newly adjust the delay angles α. At the same time the synchronization allows a gradual reversal of the direct voltage and a simultaneous keep-up of the direct current at a level which is sufficiently high to ensure sufficient reactive power consumption, so that switching operations of the additional elements for reactive power consumption, like AC filters, can be avoided. The gradual voltage change allows a gradual change of power, too, i.e. the active power and the direct voltage can be reduced to near zero. This reduces the stress on the DC cable, because the direct voltage is gradually reduced and increased instead of making a step from positive to negative direct voltage, or vice versa. At the same time, a step in reactive power which usually occurs when switching between minimum and zero active power can be avoided.

The synchronization is performed automatically by using a telecommunication link between the two converter stations and especially their two control units. In case of a back-to-back system, where rectifier and inverter are installed at the same site, the synchronization is performed internally in the system and automatically in the control unit(s) of rectifier and inverter.

According to a preferred embodiment of the invention, the change in the second station from control of the extinction angle to control of the direct current is performed while the first station still controls the direct current. For that, the first and the second station perform closed-loop direct current control, where the first station uses a first current reference value and the second station uses a second current reference value. During the beginning of the power reversal sequence, the second current reference value is set to a value which is lower than the first current reference value, which normally is about the same as the currently measured direct current, and afterwards the first current reference value is set to a value which is lower than the second current reference value.

This synchronized change of references for the direct current control in the first and the second station allows a smooth transition of the delay angles in the first and the second station, which leads to a gradual change of the direct voltage from positive to negative direction, or vice versa.

At the beginning of the power reversal, the first station is operated as rectifier with a comparatively small delay angle (α) and the second station is operated as inverter with a comparatively large delay angle (α). After changing the first and the second current reference values, the direct current is higher than the second reference value and even higher than the first reference values. As a result, the first control unit starts increasing the delay angle in the rectifier to reduce the direct current. Since the direct current will be changing in the expected direction towards the second current reference value, the direct current control algorithm in the second control unit does not yet produce an active output signal. Then comes the moment when the direct current falls below the second current reference value. Now, the second control unit starts decreasing the delay angle in the in the inverter. As a result, the direct voltage will be reduced to zero while the direct current is held around the second current reference value. At that point, only reactive power is consumed and the delay angles in both converters are near to 90 electrical degrees.

The first control unit continues to increase the delay angle in the rectifier since the first current reference value is still smaller than the second current reference value and the second control unit reacts to every successful reduction of the direct current with a further reduction of the delay angle in the inverter. This leads to a voltage with inverse polarity. When the delay angle of the first converter becomes bigger than the delay angle in the second converter, the two stations change their operating functions, i.e. the second converter becomes the rectifier and the first converter becomes the inverter. The second station continues with the direct current control, while the first station can be transferred to extinction angle control.

In an extension of the embodiment, the value to which the second current reference value is set to is a temporary value which is close to but still lower than the first current reference value before the first current reference value is set to its lower value. Since the first current reference value and the direct current should be almost identical due to being closed-loop controlled, the result for the second current reference value is the same. The difference between the first current reference value and the temporary value is preferably about 5% or less of the nominal direct current.

In a further embodiment of the invention, the second station is first changed from control of the extinction angle to control of the direct voltage before it is changed to control of the direct current. This allows the simultaneous control of direct current via the rectifier and of direct voltage via the inverter during power reversal, so that both active and reactive power can be held at desired levels during the whole power reversal sequence.

According to a specific embodiment of the invention, a power reversal procedure comprises the following steps:
  changing the second station from control of the extinction angle to closed-loop control of the direct voltage,
  reducing a second voltage reference value according to the output of a power control function which simultaneously controls the reduction of active power and the amount of reactive power, while determining the first current reference value from an active power reference value and from the measured direct voltage,
  when the direct voltage has reached a predetermined limit close to zero, which is preferably about 2% of the nominal direct voltage, setting the second current reference value to the temporary value and setting the first current reference value to the lower value,
  when the measured direct current falls below the temporary value, changing the second station to control of the direct current,
  when the measured direct voltage reaches a predetermined voltage level of inverse polarity, changing the first station to closed-loop control of the direct voltage,
  increasing a first voltage reference value of inverse polarity according to the output of a power control function which controls the increase of active power in the inverse power direction, while determining the second current reference value from the active power reference value and from the measured direct voltage, changing the first station from closed-loop control of the direct voltage to control of the extinction angle in the first converter.

In an extension of this special embodiment, the second current reference value ($I_{ref,2}$) is set to a specific value after changing the second station to control of the direct current. This special value is the same value as the first current reference value had before setting the first current reference value to the lower value. In this embodiment, the first and the second current reference values have exchanged values synchronously and the new current controlling converter in the second station is using the same reference as the previous current controlling converter in the first station.

In a still further embodiment, the first control unit additionally controls a transformer with on-load tap changers on the AC side of the first station and/or the second control unit additionally controls a transformer with on-load tap changer on the AC side of the second station. The power reversal methods known in the art often require to step the tap changers multiple times during power reversal. If frequent power reversal occurs, the frequent stepping of the tap changers leads to an increased necessity of maintenance. With the inventive method and arrangement, the number of tap changer steps during power reversal is reduced, preferably to zero, which reduces the wear and tear of the tap changers. Therefore it is a feature of the still further embodiment that a tap changer control function in the first and/or the second station is blocked before power reversal and released after power reversal. In an extension of this embodiment the tap changer control function in the first and/or the second station is blocked except for tap changer steps to reduce the valve stresses. Even though a limited number of tap changer steps is now allowed, it still helps to reduce the total number of tap changer steps performed during power reduction from nominal to minimum power from about 6 to 8 down to 1 to 2 steps.

BRIEF DESCRIPTION OF THE DRAWINGS

The present invention is now described by way of example with reference to the accompanying drawings in which.

DETAILED DESCRIPTION OF EMBODIMENTS OF THE INVENTION

Figure 1:
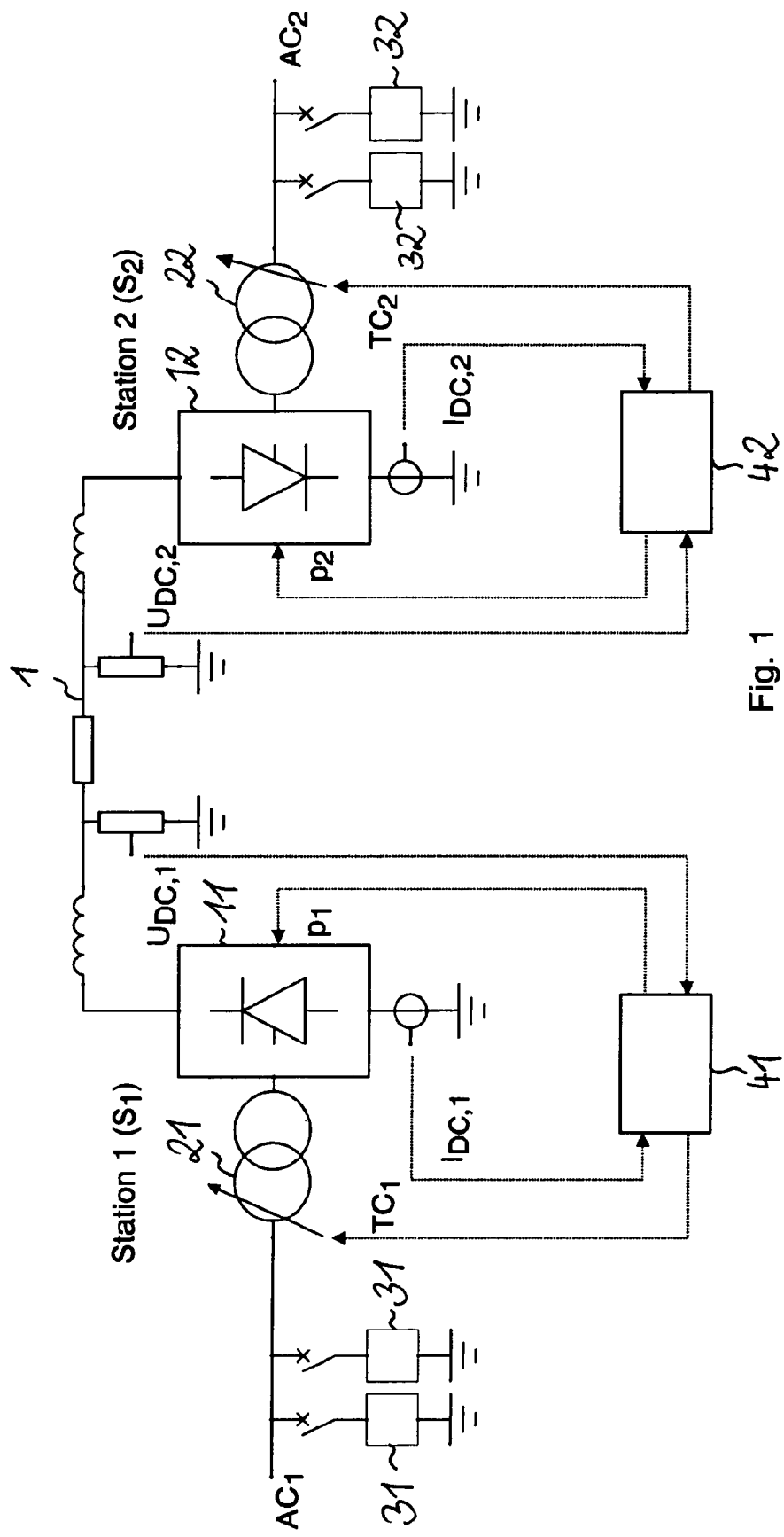
FIG. 1 shows a direct current power transmission system.

In FIG. 1 a direct current power transmission system is shown which comprises a first converter station $S_1$ and a second converter station $S_2$. The converter stations $S_1$ and $S_2$ are coupled to each other via a direct current link 1. The direct current power transmission system is used to transfer active power P between a first alternative current power system $AC_1$ and a second alternative current power system $AC_2$.

Each of the converter stations $S_1$ and $S_2$ contains a line commutated converter 11 or 12, a transformer 21 or 22 with an on-load tap changer as well as elements for reactive power consumption which in this example are AC filters 31 and 32. The operation of the converter 11 and of the tap changer of the first converter station $S_1$ is controlled via a first control unit 41. And the operation of the converter 12 and of the tap changer of the second converter station $S_2$ is controlled via a second control unit 42. The first and the second control units 41 and 42 each receive as input signals the measured direct current $I_{DC,1}$ and $I_{DC,2}$ and the measured direct voltage $U_{DC,1}$ and $U_{DC,2}$, which they transform into general values of the direct current $I_{DC}$ and of the direct voltage $U_{DC}$. From these input signals, the first and the second control units 41 and 42 each produce as output signals the firing pulses $p_1$ or $p_2$ for the respective converter 11 or 12 and the tap changer control signals $TC_1$ or $TC_2$ to step the on-load tap changer of the respective transformer 21 or 22.

In the following it is assumed that the first converter 11 is operated by the first control unit 41 as rectifier, i.e. the first station $S_1$ transfers active power P from its AC side $AC_1$ to the direct current link 1. At the same time, the second converter 12 is operated by the second control unit 42 as inverter and transfers active power P from the direct current link 1 to its AC side $AC_2$.

Figure 2:
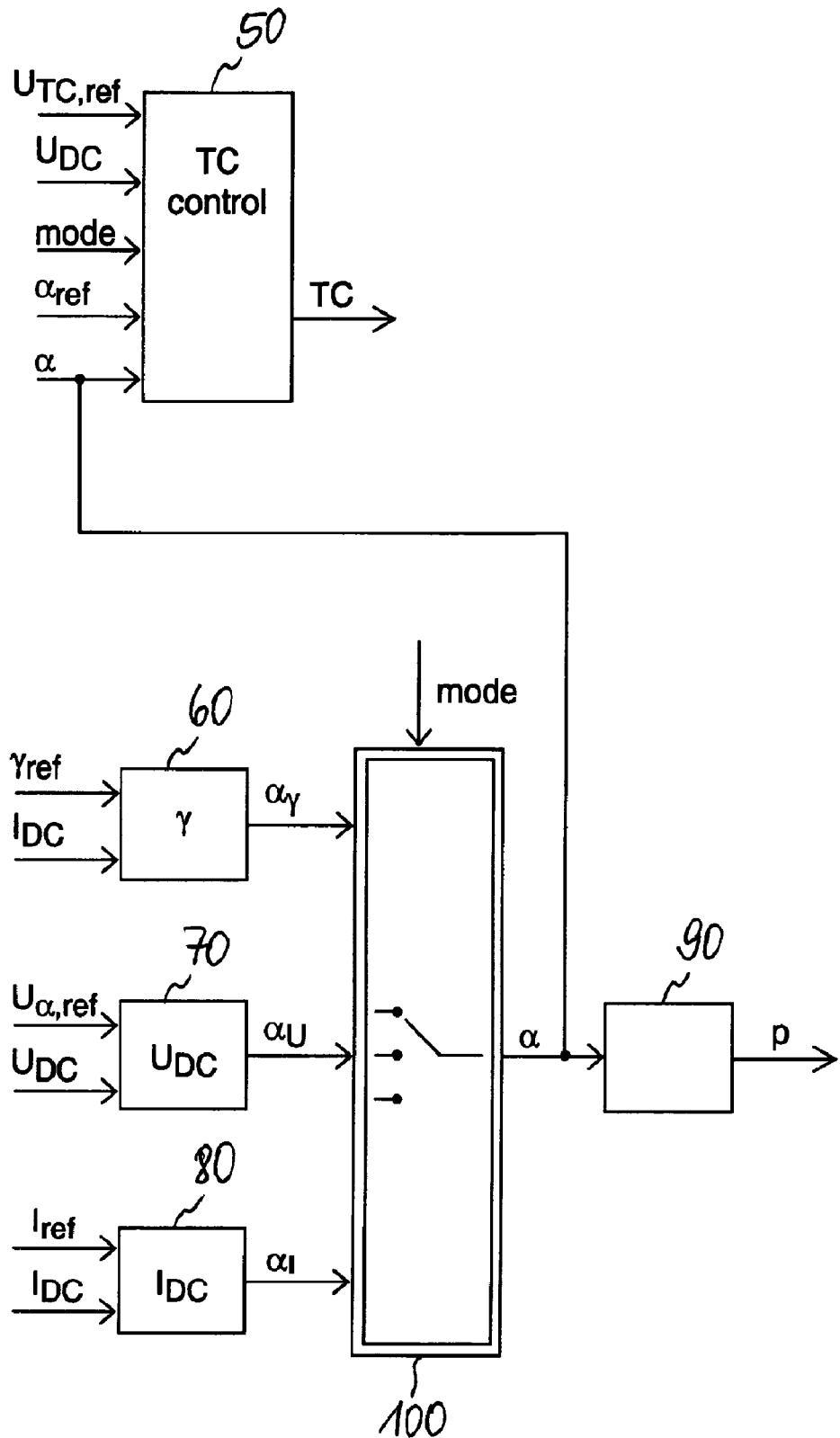
FIG. 2 shows a general block diagram of the control functions in a first or a second control unit, respectively.

FIG. 2 shows a block diagram of the control functions of the first and the second control unit 41 and 42, respectively. The general structure is known in the art and is identical in both control units 41 and 42. Therefore, the subscripts 1 and 2 to identify the first and the second control unit, respectively, were omitted.

A tap changer control function 50 generates a tap changer control signal TC, where the operational mode of the respective converter determines the way the tap changer control function 50 works. If the converter is operated as inverter, the control signal TC is determined so that the direct voltage $U_{DC}$ is adjusted to be close to a direct voltage reference value $U_{TC,ref}$. If the converter is operated as rectifier, the tap changer is controlled to give a delay angle α close to a delay angle reference value $α_{ref}$.

Furthermore, the operational mode of the converter determines the kind of control function used to determine the firing pulses p for the converter. If the operational mode indicates that the converter is operated as inverter, either the output $α_γ$ of the control function 60 for the extinction angle γ or the output $α_U$ of the control function 70 for the direct voltage $U_{DC}$ is used as the desired delay angle α. From the desired angle α, a firing control function 90 determines the corresponding firing pulses p. If the operational mode indicates rectifier operation, the output $α_I$ of the control function 80 for the direct current $I_{DC}$ is chosen.

Both, the direct voltage and the direct current control functions 70 and 80 are closed-loop control functions which adjust the measured value of the direct voltage $U_{DC}$ or direct current $I_{DC}$ to its reference value $U_{α,ref}$ or $I_{DC,ref}$ respectively, by changing the value of the delay angle $α_U$ or $α_I$. However, the control function 60 of the extinction angle γ is an open-loop control function which calculates a suitable delay angle $α_γ$ from a reference extinction angle $γ_{ref}$ and from the measured direct current $I_{DC}$.

Figure 3:
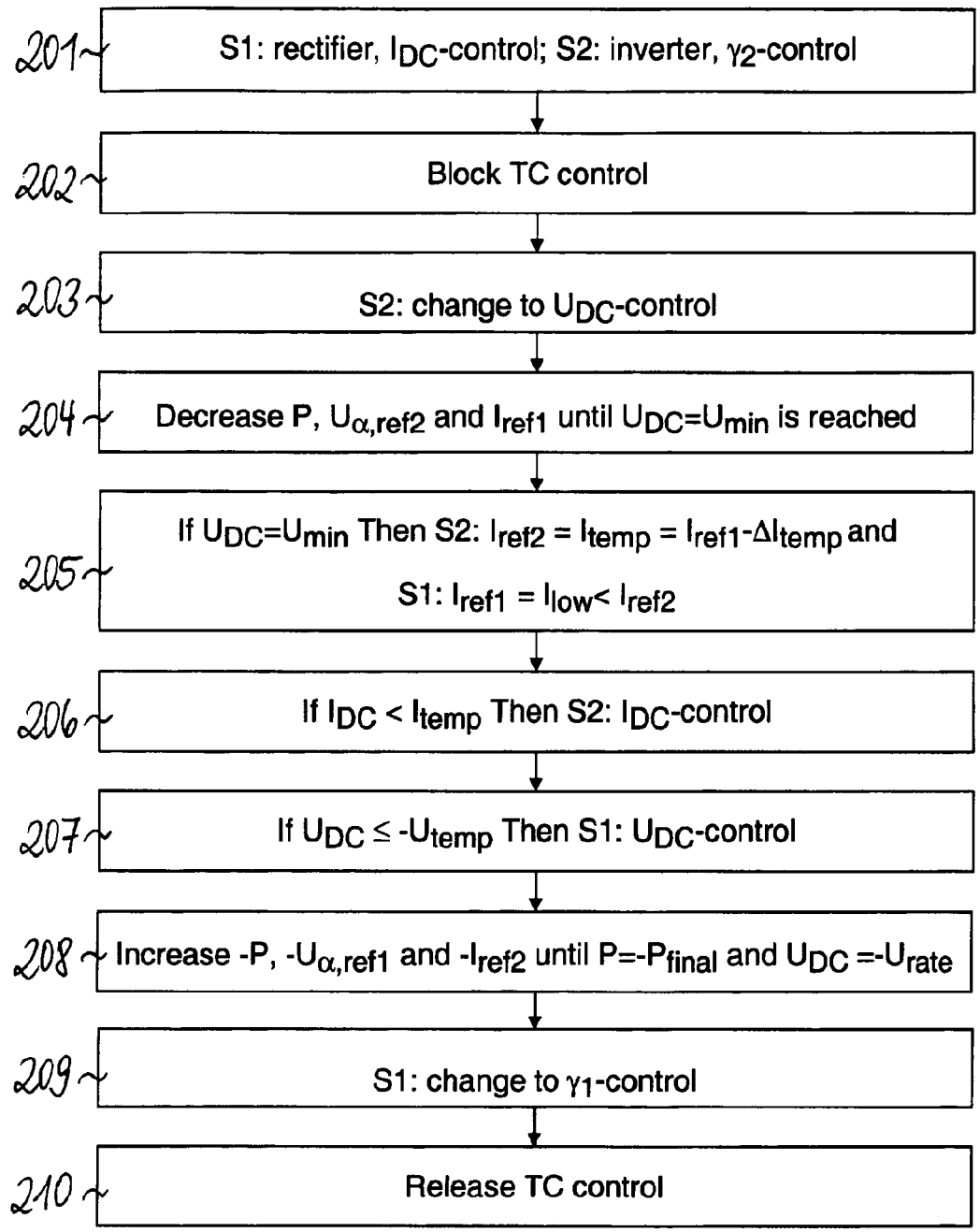
FIG. 3 shows the flowchart of a power reversal method.

The function 100 to determine the desired delay angle α is a nonlinear function which plays an important role during reversal of the direction of active power P. This is now further explained with respect to FIG. 3. FIG. 3 shows the method steps of a power reversal, where the decisions and procedures in the two control units 41 and 42 are illustrated in combined form.

As already described, active power P is transmitted from side $AC_1$ to side $AC_2$ before power reversal. The level of power just before reversal is called start level $P_{start}$. In this stage, which is depicted as step 201 in FIG. 3, the first converter 11 is operated rectifier and the first control unit 41 performs control of the direct current $I_{DC}$, i.e. the output $α_{I,1}$ of function 80 is used in the first control unit 41 to generate the firing pulses for the first converter 11. At the same time, the second control unit 42 operates the second converter 12 as inverter and controls the extinction angle $\gamma_2$ of the second converter using the output $\alpha_{\gamma,2}$ of its function 60. In the next step 202, the tap changer control functions 50 in both control units 41 and 42 are blocked, except for possible tap changer steps that would decrease the valve side AC voltage in order to reduce the valve stresses.

In the next step 203, the nonlinear function 100 in the second control unit 42 changes from control of the extinction angle $\gamma_2$ in the second converter 12 to control of the direct voltage $U_{DC}$, i.e. the output $\gamma_{U,2}$ of control function 70 is now let through instead of the output $\alpha_{\gamma,2}$ of control function 60. This step can also be performed after a while during step 204.

Afterwards in step 204, the active power P is decreased with a certain ramp rate by simultaneously decreasing the direct current $I_{DC}$ via the rectifier-control in the first control unit 41 as well as the direct voltage $U_{DC}$ via the inverter-control in the second control unit 42. The direct voltage $U_{DC}$ is controlled in the second control unit 42 with respect to a second voltage reference value $U_{\alpha,ref2}$, where the second voltage reference value $U_{\alpha,ref2}$ is decreased according to the output of a power control function $g(P_{ref}, Q_{ref})$ which simultaneously controls the reduction of active power P according to an active power reference value $P_{ref}$ as well as the amount of reactive power Q according to a reactive power reference value $Q_{ref}$. At the same time, the first control unit 41 controls the direct current $I_{DC}$ with respect to a first current reference value $I_{ref1}$ which is determined mainly from the active power reference value $P_{ref}$ and the measured direct voltage $U_{DC}$.

Figure 4:
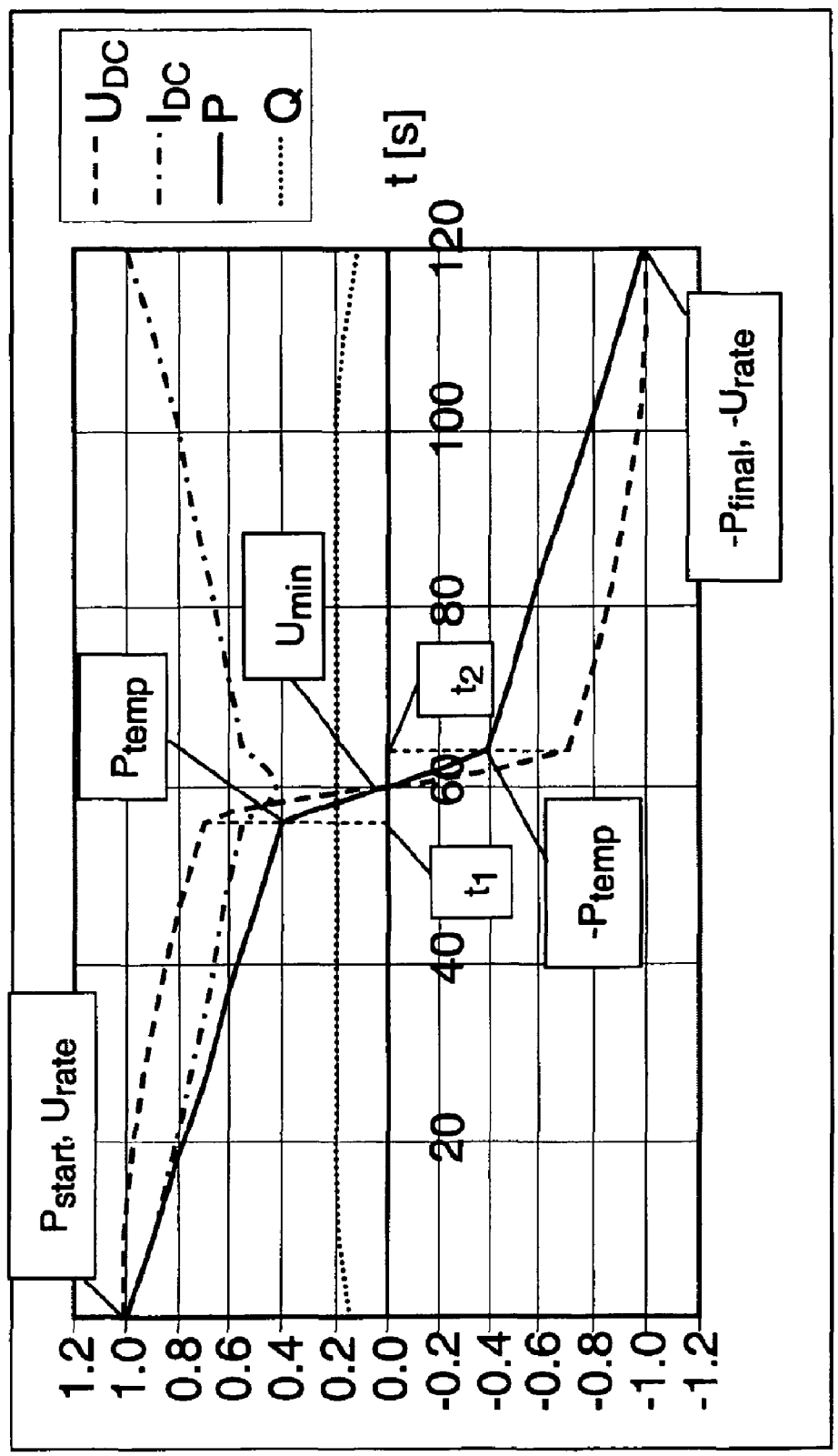
FIG. 4 shows a time dependent diagram of different electrical quantities during power reversal.

If active power P is decreased to a low power level, the stresses for the thyristor valves in the converters 11 and 12 increase due to firing angels near 90 electrical degrees. In order to reduce the time period at low power level, it is preferred to increase the ramp rate of the power decrease in the low power region. An example of the time dependent graphs of active power P, reactive power Q, direct voltage $U_{DC}$ and direct current $I_{DC}$ is shown in FIG. 4, where the increase of the ramp rate between the times $t_1$ and $t_2$ and between the respective predetermined power levels $+P_{temp}$ and $-P_{temp}$ is clearly visible. The active power P is decreased under control until the direct voltage $U_{DC}$ has reached a predetermined limit $U_{min}$ close to zero. The predetermined voltage limit $U_{min}$ is preferably defined as a value around 2% of the nominal direct voltage $U_{DC,nom}$.

In step 205, when the direct voltage $U_{DC}$ has reached the predetermined limit $U_{min}$, the second control unit 42 sets a second current reference value $I_{ref2}$ which is input to the current control function 80 to a temporary value $I_{temp}$. The temporary current value $I_{temp}$ is close to but still lower than the first current reference value $I_{ref1}$ and is smaller than the currently measured direct current $I_{DC}$. The difference $\Delta I_{temp}$ between the first current reference value $I_{ref1}$ and the temporary current value $I_{temp}$ is preferably about 5% or less of the nominal direct current $I_{DC,nom}$. Directly afterwards the first control unit 41 sets the first current reference value $I_{ref1}$ to a value $I_{low}$ which is lower than the second current reference value $I_{ref2}$.

Since the first current reference value $I_{ref1}$ is decreased, control function 80 in the first control unit 41 reduces the direct current $I_{DC}$ accordingly by increasing the delay angle $\alpha_1$ of the first converter 11. If the direct current $I_{DC}$ falls below the temporary current value $I_{temp}$, the nonlinear function 100 in the second control unit 42 starts the direct current control function 80, i.e. the output $\alpha_{I,2}$ is used to generate the firing pulses $p_2$ for the second converter 12 (step 206). In order to keep the direct current $I_{DC}$ at the temporary current value $I_{temp}$, the second control unit 42 decreases the delay angle $\alpha_2$ in the second converter 12, i.e. the inverter. This leads to a reduction of direct voltage $U_{DC}$.

The first control unit 41 continues to increase the delay angle $\alpha_1$ in the rectifier since the first current reference value $I_{ref1}$ is still lower than the second current reference value $I_{ref2}$. The second control unit 42 simultaneously reacts with a further reduction of the delay angle $\alpha_2$ in the second converter 11. The result is a further reduction in the direct voltage $U_{DC}$, until it crosses zero and continues to increase with inverse polarity. When the delay angle $\alpha_1$ of the first converter 11 becomes bigger than the delay angle $\alpha_2$ in the second converter, the two converters change automatically their operating functions, i.e. the second converter 12 becomes rectifier and the first converter 11 becomes inverter.

In step 207, when the direct voltage has changed polarity and reached up a predetermined voltage level $-U_{temp}$ of inverse polarity, the nonlinear function 100 in the first control unit 41 changes to direct voltage control by using the output $\alpha_{U1}$ of function 70 while the second control unit 42 continues with the direct current control 80.

Afterwards, in step 208, the active power P, which has now changed direction and thereby changed sign, is increased to the final level $-P_{final}$ by increasing the direct current $I_{DC}$ via the rectifier-control in the second control unit 42 as well as increasing the direct voltage $U_{DC}$ to its rated value $-U_{rate}$ via the inverter-control in the first control unit 41. During the power increase in the inverse direction or directly afterwards (step 209), the first control unit 41 changes to control of the extinction angle $\gamma_1$ in the first converter 11, which is now inverter.

In step 210 the power reversal is terminated with the release of the tap changer control in both the first and the second control units 41 and 42.

Alternatively to the example described with the FIGS. 1 to 4, the polarity of the direct voltage and the direction of the active power could as well change from negative to positive, using the same method and system described above.

In further alternative solutions, the first and the second control units 41 and 42 could additionally control the switching operation of the elements for reactive power consumption, and the control units 41 and 42 could be integrated into one and the same hardware unit, for example in case of a back-to-back direct current transmission system or in case of a centralized remote control.

The invention claimed is:

1. A method to reverse a power flow between a first and a second converter station which are coupled to each other via a direct current link, where each converter station comprises a first or second line commutated converter, respectively, the method comprising:
   operating the first converter as a rectifier before power reversal and as an inverter after power reversal,
   operating the second converter as an inverter before power reversal and as a rectifier after power reversal,
   controlling in the first station a direct current,
   controlling in the second station an extinction angle of the second converter or controlling a direct voltage,
   carrying out during power reversal a change in the first station from control of the direct current to control of the extinction angle of the first converter or to control of the direct voltage, which is performed in synchronization with a change in the second station from control of the extinction angle of the second converter or from control of the direct voltage to control of the direct current.

2. The method according to claim 1, where during power reversal the change in the second station from control of the extinction angle or from control of the direct voltage to control of the direct current is performed while the first station still controls the direct current, in the first and in the second station the direct currents is closed-loop controlled, using a first current reference value in the first station and a second current reference value in the second station, the second current reference value is set to a value which is lower than the first current reference value, and afterwards the first current reference value is set to a value which is lower than the second current reference value.

3. The method according to claim 2, wherein the value of the second current reference value is set to a temporary value which is close to but still lower than the first current reference value before the first current reference value is set to the lower value.

4. The method according to claim 3, wherein during power reversal the second station is first changed from control of the extinction angle to control of the direct voltage before it is changed to control of the direct current.

5. The method according to claim 4, wherein during power reversal the following steps are performed:

changing the second station from control of the extinction angle to closed-loop control of the direct voltage, reducing a second voltage reference value according to the output of a power control function, which simultaneously controls the reduction of active power and the amount of reactive power, while determining the first current reference value from the active power reference value and from the measured direct voltage, when the direct voltage has reached a predetermined limit close to zero, setting the second current reference value to the temporary value and setting the first current reference value to the lower value, when the measured direct current falls below the temporary value changing the second station to control of the direct current, when the measured direct voltage reaches a predetermined voltage level of inverse polarity changing the first station to control of the direct voltage, increasing a first voltage reference value of inverse polarity according to the output of a power control function which controls the increase of active power in the inverse power direction, while determining the second current reference value from the active power reference value and from the measured direct voltage, and changing the first station from closed-loop control of the direct voltage with inverse polarity to control of the extinction angle of the first converter.

6. The method according to claim 5, wherein after changing the second station to control of the direct current the second current reference value is set to the same value as the first current reference value had before setting the first current reference value to the lower value.

7. The method according to claim 5, wherein in the beginning of the power reversal the active power is reduced at a first ramp rate and where after reduction to a predetermined power level the power is further reduced at a second ramp rate which is higher than the first ramp rate.

8. The method according to claim 1, wherein an on-load tap changer control function, which controls an on-load tap changer of a transformer on the AC side of the first or the second station, is blocked before power reversal and where the on-load tap changer control function is released after power reversal.

9. The method according to claim 8, wherein the on-load tap changer control function is blocked except for tap changer steps to reduce the valve stresses.

10. An arrangement to reverse a power flow between a first and a second converter station which are coupled to each other via a direct current link, where each converter station comprises a first or second line commutated converter, the arrangement comprising:

a first control unit adapted to control the operation of the first station and a second control unit adapted to control the operation of the second station, wherein the first control unit is adapted to before power reversal operate the first converter as a rectifier and to control the direct current and the second control unit is adapted to before power reversal operate the second converter as an inverter and to control the extinction angle in the second converter or the direct voltage, the first control unit is adapted to after power reversal operate the first converter as an inverter and the second control unit is adapted to after power reversal operate the second converter as a rectifier, the first control unit is adapted to during power reversal change from control of the direct current to control of the extinction angle of the first converter and the second control unit is adapted to during power reversal change from control of the extinction angle of the second converter or from control of the direct voltage to control of the direct current, while the first and the second control unit are adapted to perform the changes during power reversal synchronized with each other.

11. The arrangement according to claim 10, wherein the first control unit is adapted to control a transformer with on-load tap changer on the AC side of the first station and/or the second control unit is adapted to control a transformer with on-load tap changer on the AC side of the second station and wherein the first and/or the second control unit is adapted to block the respective tap changer control before power reversal and to release the respective tap changer control after power reversal.

12. The arrangement according to claim 11, wherein the first and/or the second control unit is adapted to block the respective tap changer control except for tap changer steps to reduce the valve stresses.

13. The arrangement according to claim 10, wherein the first and/or the second control unit is adapted to control additional reactive power compensators.

* * * * *